US012602602B2

(12) United States Patent
Singla et al.

(10) Patent No.: US 12,602,602 B2
(45) Date of Patent: Apr. 14, 2026

(54) SYSTEMS AND METHODS FOR VALIDATING FORECASTING MACHINE LEARNING MODELS

(71) Applicant: Verizon Patent and Licensing Inc., Basking Ridge, NJ (US)

(72) Inventors: Kushal Singla, Bangalore (IN); Subham Biswas, Thane (IN)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1049 days.

(21) Appl. No.: 17/304,415

(22) Filed: Jun. 21, 2021

(65) Prior Publication Data

US 2022/0405611 A1 Dec. 22, 2022

(51) Int. Cl.
*G06N 20/00* (2019.01)
*G06N 5/04* (2023.01)
*G06Q 10/04* (2023.01)
*G06Q 30/016* (2023.01)

(52) U.S. Cl.
CPC .............. *G06N 5/04* (2013.01); *G06N 20/00* (2019.01); *G06Q 10/04* (2013.01); *G06Q 30/016* (2013.01)

(58) Field of Classification Search
CPC .......... G06N 5/04; G06N 20/00; G06Q 10/04; G06Q 30/016
See application file for complete search history.

(56) References Cited

U.S. PATENT DOCUMENTS

| | | | | |
|---|---|---|---|---|
| 10,984,113 B1* | 4/2021 | Dhaliwal | ............... | H04L 63/14 |
| 2010/0162402 A1* | 6/2010 | Rachlin | .............. | G06F 21/6254 |
| | | | | 726/26 |
| 2017/0373535 A1* | 12/2017 | Dam | ......................... | H02J 3/00 |
| 2020/0380336 A1* | 12/2020 | Chowdhury | ........... | G06N 3/044 |
| 2021/0390457 A1* | 12/2021 | Romanowsky | .......... | G06N 5/04 |
| 2022/0058176 A1* | 2/2022 | Rhode | ..................... | G06F 30/15 |
| 2022/0330090 A1* | 10/2022 | Han | ........................ | G06N 20/20 |
| 2022/0335255 A1* | 10/2022 | Zohrevand | ............ | G06F 18/211 |

OTHER PUBLICATIONS

MAPE v/s MAE% v/s RMSE https://agrimabahl.medium.com/mape-v-s-mae-v-s-rmse-3e358fd58f65 (Year: 2019).*
NeurIPS-2020-what-went-wrong-and-when-instance-wise-feature-importance-for-time-series-black-box-models-Paper (Year: 2020).*

* cited by examiner

*Primary Examiner* — Mohamed Abou El Seoud

(57) ABSTRACT

A device may receive historical time series data and output data associated with a forecasting model and may process the historical time series data and the output data, with a proxy regression model, to determine inference data. The device may create perturbed data from the historical time series data, the output data, and the inference data, and may process the perturbed data, with the proxy regression model, to generate labelled data and to identify top features of the labelled data. The device may process subsets of the top features of the labelled data, with the proxy regression model, to determine feature data identifying an importance of each of the subsets of the top features, and may evaluate the proxy regression model and the feature data to calculate validation data for validating the forecasting model. The device may validate the forecasting model with the validation data.

18 Claims, 10 Drawing Sheets

100

120

Process the historical time series data and the output data, with a proxy regression model, to determine inference data identifying an importance of each time step of the historical time series data Validation system
110

115

Receive historical time series data and output data associated with a forecasting model Server device
105

125
Create perturbed data from the historical time series data, the output data, and the inference data Perturbed data Create perturbed data Validation system 110

Historical time series data

Output data

Inference data

130

Process the perturbed data, with the proxy regression model, to generate labelled data and to identify top features of the labelled data Labelled data Top features Proxy regression model Perturbed data Validation system 110

100

135
Process subsets of the top features of the labelled data, with the proxy regression model, to determine feature data identifying an importance of each of the subsets of the top features Feature data Proxy regression model Top features Validation system 110

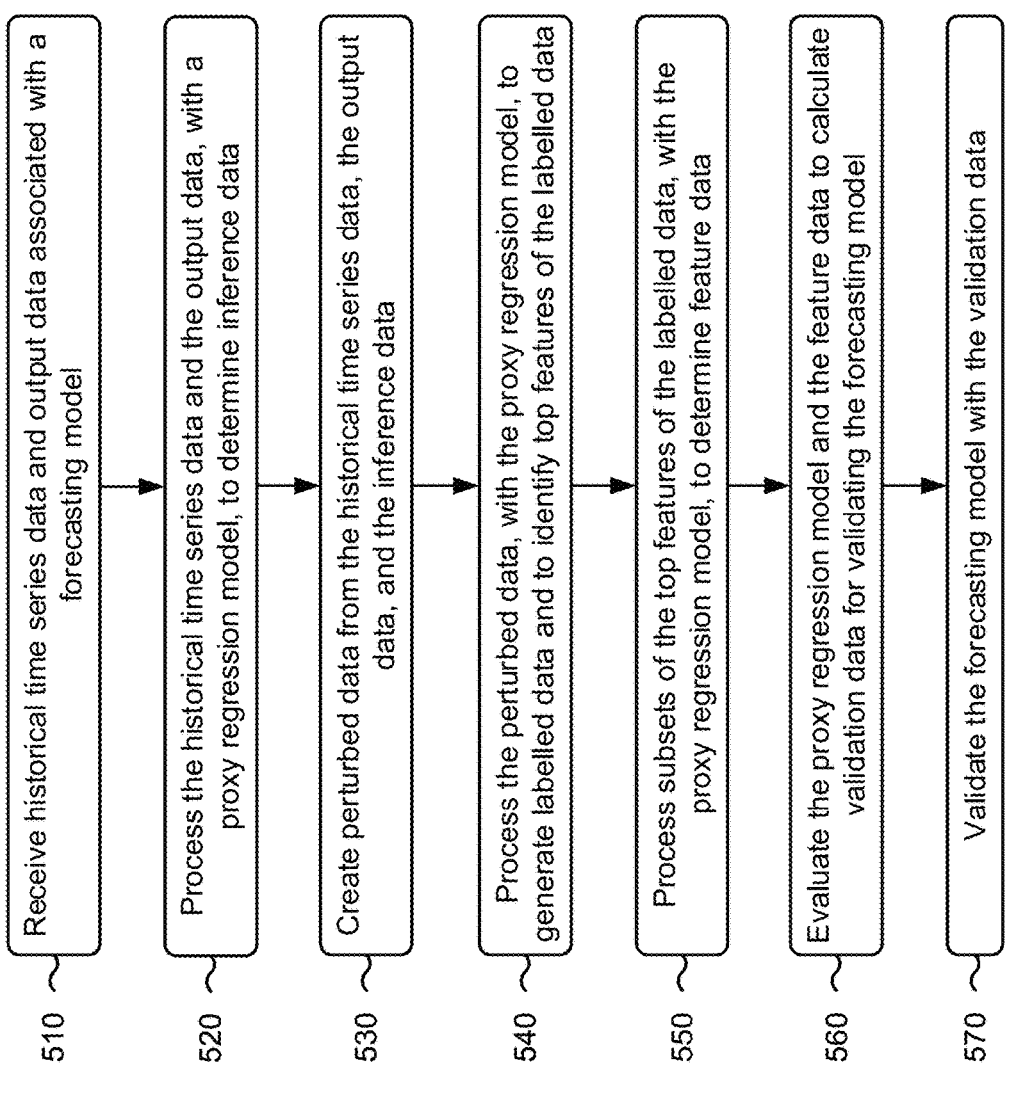

500

510  Receive historical time series data and output data associated with a forecasting model 520  Process the historical time series data and the output data, with a proxy regression model, to determine inference data 530  Create perturbed data from the historical time series data, the output data, and the inference data 540  Process the perturbed data, with the proxy regression model, to generate labelled data and to identify top features of the labelled data 550  Process subsets of the top features of the labelled data, with the proxy regression model, to determine feature data 560  Evaluate the proxy regression model and the feature data to calculate validation data for validating the forecasting model 570  Validate the forecasting model with the validation data

FIG. 5

SYSTEMS AND METHODS FOR VALIDATING FORECASTING MACHINE LEARNING MODELS

BACKGROUND

A machine learning model that generates forecasts based on univariate time series data may be referred to as a forecasting machine learning model or a forecasting model. Forecasting machine learning models include classical models, such as linear models and exponential smoothing models, and more sophisticated models, such as decision tree models, multilayer perceptron model, long short-term memory (LSTM) network models, and/or the like.

BRIEF DESCRIPTION OF THE DRAWINGS

FIGS. 1A-1F are diagrams of an example associated with validating forecasting machine learning models.

FIG. 5 is a flowchart of an example process relating to validating forecasting machine learning models.

DETAILED DESCRIPTION OF PREFERRED EMBODIMENTS

Figure 1A:
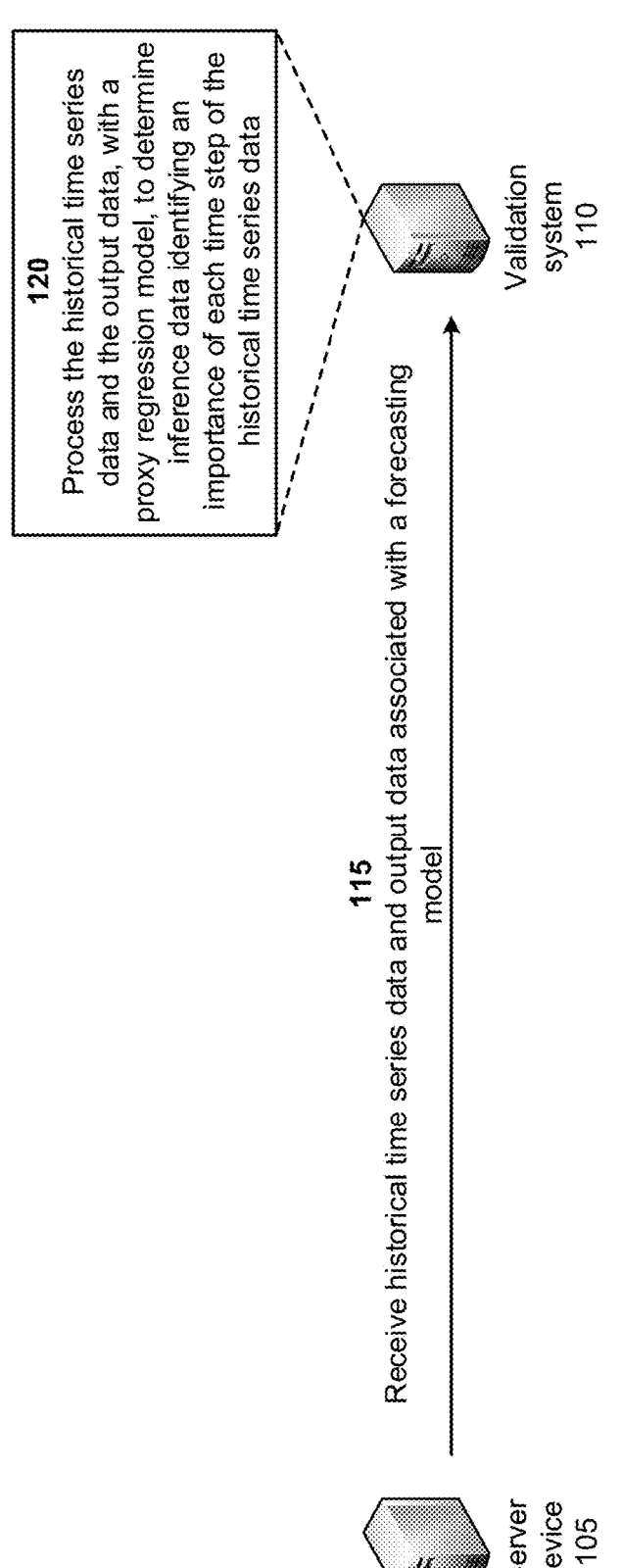

The following detailed description of example implementations refers to the accompanying drawings. The same reference numbers in different drawings may identify the same or similar elements.

Identification of the most important and significant features for an output of a forecasting machine learning model may aid in validating the forecasting machine learning model prior to deploying the forecasting machine learning model. However, current techniques for validating a forecasting machine learning model fail to identify such important and significant features for the output of the forecasting machine learning model. Thus, current techniques for validating a forecasting machine learning model consume computing resources (e.g., processing resources, memory resources, communication resources, and/or the like), networking resources, and other resources associated with validating an incorrect forecasting machine learning model, deploying the incorrect forecasting machine learning model, handling customer complaints associated with the incorrect forecasting machine learning model, utilizing resources inefficiently and ineffectively based on an output of the incorrect forecasting machine learning model, and/or the like.

Some implementations described herein provide a validation system that validates forecasting machine learning models. For example, the validation system may receive historical time series data and output data associated with a forecasting model and may process the historical time series data and the output data, with a proxy regression model, to determine inference data identifying an importance of each time step of the historical time series data. The validation system may create perturbed data from the historical time series data, the output data, and the inference data and may process the perturbed data, with the proxy regression model, to generate labelled data and to identify top features of the labelled data relative to other features of the labelled data. The validation system may process subsets of the top features of the labelled data, with the proxy regression model, to determine feature data identifying an importance of each of the subsets of the top features and may evaluate the proxy regression model and the feature data to calculate validation data for validating the forecasting model. The validation system may validate the forecasting model with the validation data.

In this way, the validation system validates forecasting machine learning models. The validation system may identify the most important and significant features for an output of a forecasting machine learning model and may validate the forecasting machine learning model based on the features prior to deploying the forecasting machine learning model. The validation system may utilize the features to debug and improve the quality of the forecasting machine learning model. Thus, the validation system conserves computing resources, networking resources, and other resources that would otherwise be consumed in validating an incorrect forecasting machine learning model, deploying the incorrect forecasting machine learning model, handling customer complaints associated with the incorrect forecasting machine learning model, utilizing resources inefficiently and ineffectively based on an output of the incorrect forecasting machine learning model, and/or the like.

FIGS. 1A-1F are diagrams of an example 100 associated with validating forecasting machine learning models. As shown in FIGS. 1A-1F, example 100 includes a server device 105 and a validation system 110. Further details of the server device 105 and the validation system 110 are provided below.

As shown in FIG. 1A, and by reference number 115, the validation system 110 may receive historical time series data and output data associated with a forecasting model. For example, the validation system 110 may receive the historical time series data and the output data from an entity associated with the forecasting model (e.g., a network provider or manager, a call center, a customer service center, and/or the like). The historical time series data may include univariate time series data, such as original time series data with respect to dates when the original time series data was recorded, data identifying the dates when the original time series data was recorded, and/or the like.

The output data may include time series data output by the forecasting model with respect to the dates when the original time series data was recorded, data identifying the dates when the original time series data was recorded, and/or the like. For example, the forecasting model may generate or output a network load prediction for operation of a network, a call center staffing prediction for a customer service center, and/or the like. In some implementations, the forecasting model may include a time series model, an econometric model (e.g., an autoregressive integrated moving average (ARIMA) model, a seasonal ARIMA (SARIMA) model, and/or the like), a judgmental forecasting model, a Delphi model, a linear model, an exponential smoothing model, a decision tree model, a multilayer perceptron model, an LSTM network model, and/or the like.

As further shown in FIG. 1A, and by reference number 120, the validation system 110 may process the historical time series data and the output data, with a proxy regression model, to determine inference data identifying an importance of each time step of the historical time series data. In some implementations, the historical time series data is a predictor for the proxy regression model and the output data is a label for the proxy regression model. The validation system 110 may train the proxy regression model with the historical time series data and the output data, and the trained proxy regression model may output the inference data identifying the importance of each time step (e.g., each feature) of the historical time series data. The proxy regression model may simulate and/or replicate what the initial forecasting model learned. Since the output label is a proxy regression model label, the proxy regression model is able to retrieve what the initial forecasting model learned.

In some implementations, the proxy regression model includes one or more of a linear regression model, a random forest model, a logistic regression model, a ridge regression model, a lasso regression model, a polynomial regression model, and/or the like. In some implementations, the importance of each time step of the historical time series data is relative to other time steps of the historical time series data.

Figure 1B:
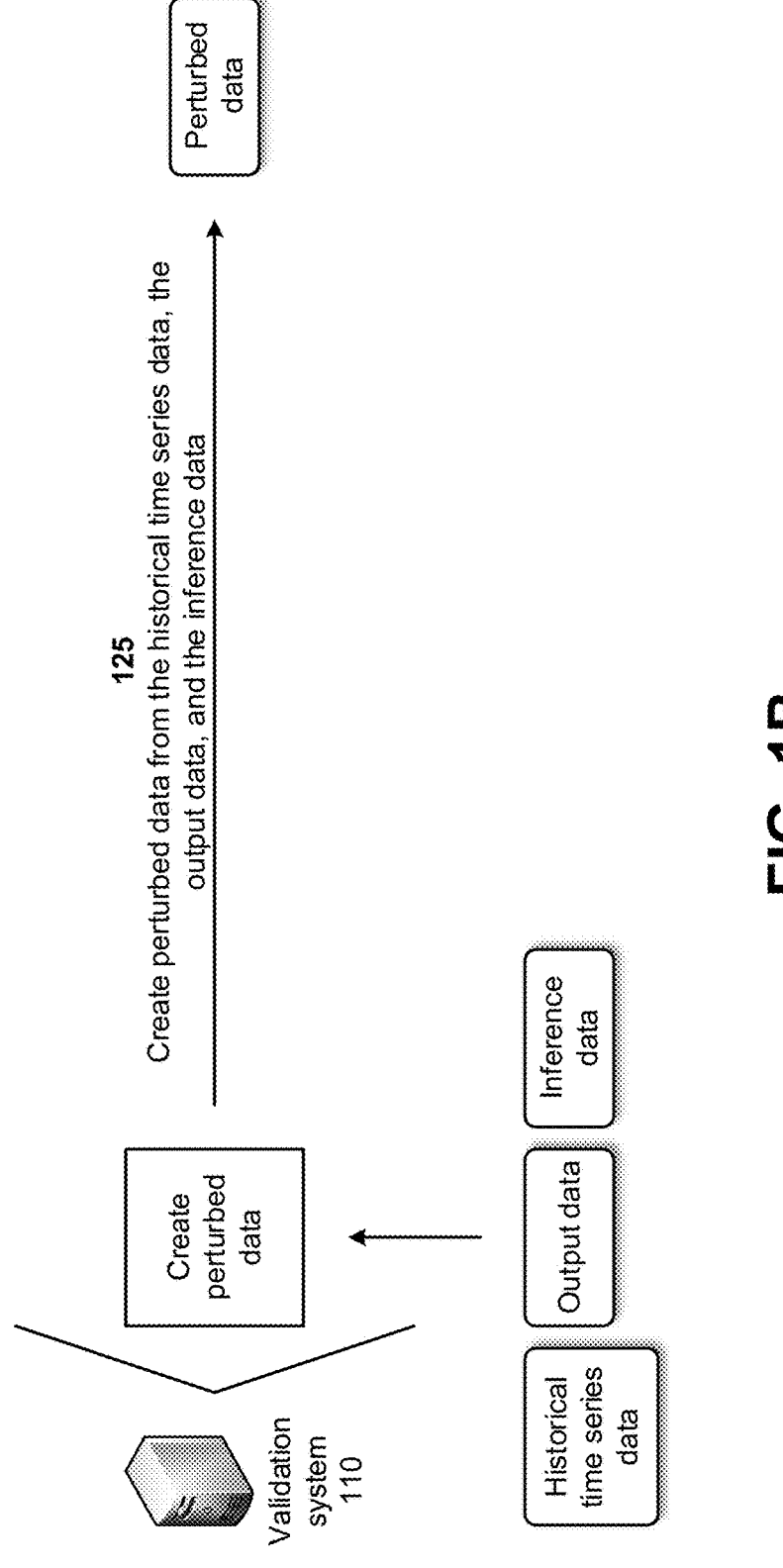

As shown in FIG. 1B, and by reference number 125, the validation system 110 may create perturbed data from the historical time series data, the output data, and the inference data. The perturbed data may include synthetic data that is created by sampling from a data distribution (e.g., a normal distribution) and utilizing the sampled data. The perturbed data may include the historical time series data, the output data, and the inference data but may also include noise data that protects confidential information included in the historical time series data, the output data, and the inference data. The perturbed data may enable users to ascertain key summary information about the historical time series data, the output data, and the inference data, without creating a confidentiality breach.

In some implementations, the validation system 110 may analyze the historical time series data, the output data, and the inference data and may identify confidential data in the historical time series data, the output data, and the inference data based on the analysis. The validation system 110 may replace or modify the confidential data with synthetic or noisy data so that the confidential data cannot be discerned in the perturbed data.

Figure 1C:
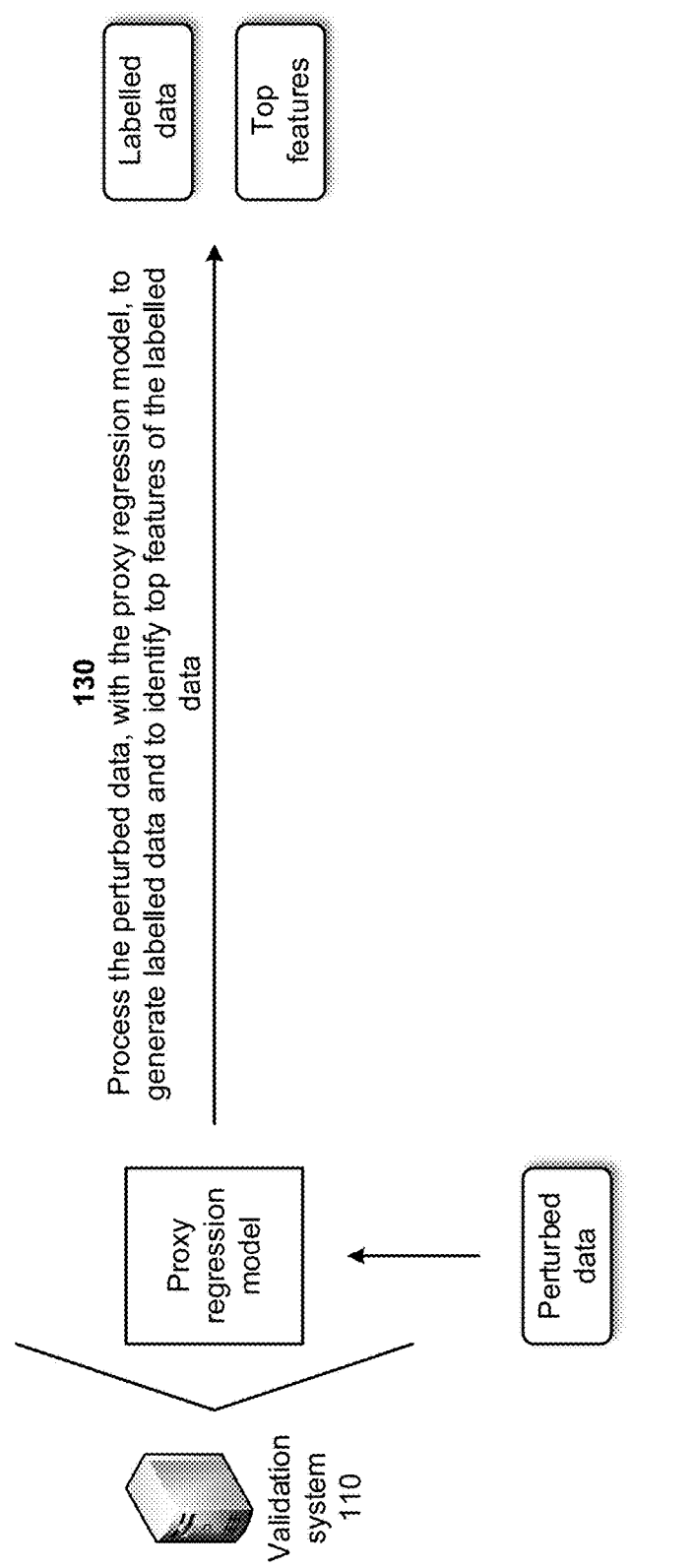

As shown in FIG. 1C, and by reference number 130, the validation system 110 may process the perturbed data, with the proxy regression model, to generate labelled data and to identify top features of the labelled data. The labelled data may include labels or tags that describe the data points of the perturbed data. The proxy regression model may augment a set of unlabeled data (e.g., the perturbed data) with informative data labels or data tags. For example, a data label may indicate whether a photo contains a horse or a cow, which words were uttered in an audio recording, what type of action is being performed in a video, a topic of a news article, an overall sentiment of a social media post, and/or the like, while keeping the time series context.

In some implementations, the validation system 110 (e.g., via the proxy regression model) may identify the top features of the labelled data by determining occurrences of each of the data labels in the labelled data and by ranking each of the data labels based on the occurrences. The validation system 110 may then identify the top data labels (e.g., the top features) in the labelled data based on the rankings of the data labels.

Figure 1D:
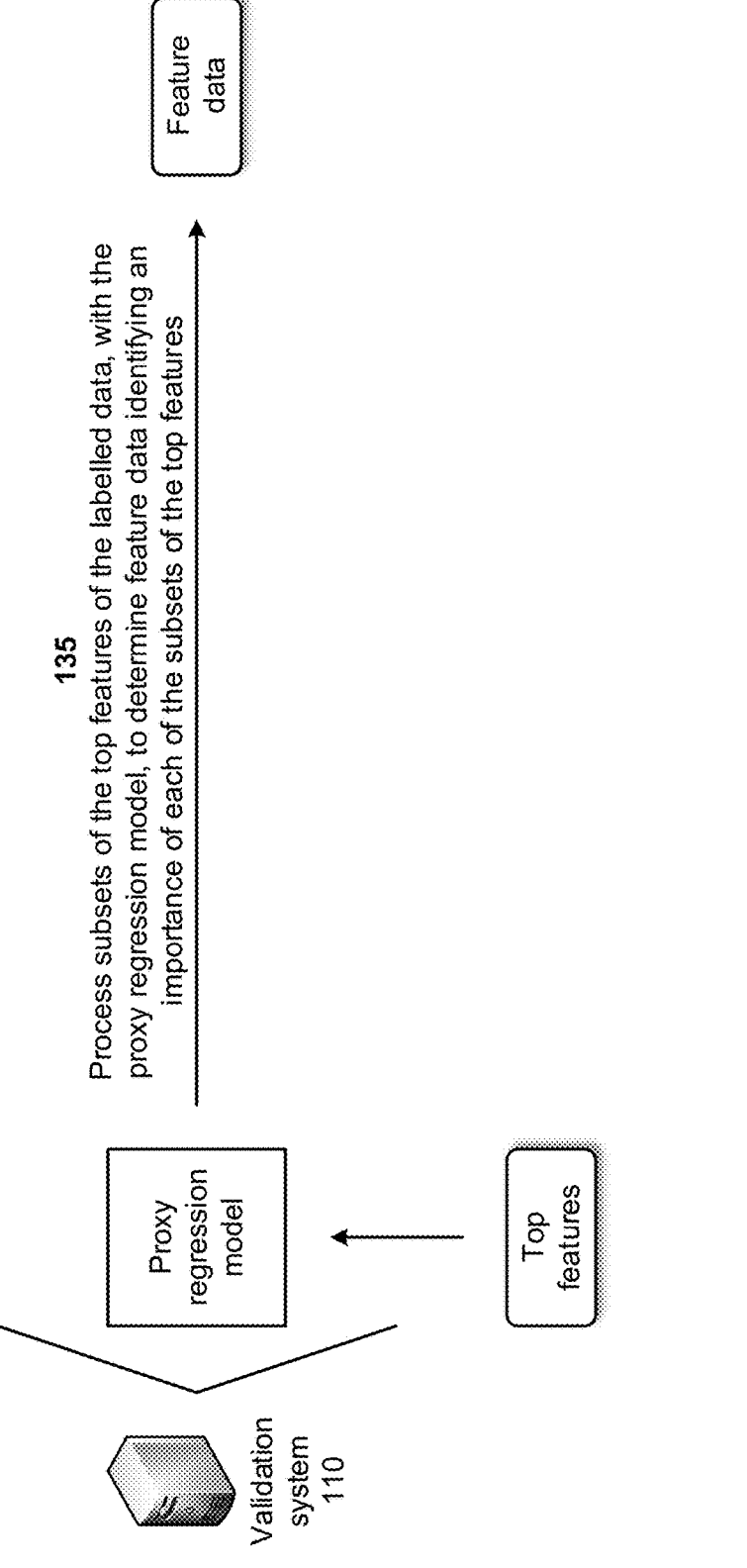

As shown in FIG. 1D, and by reference number 135, the validation system 110 may process subsets of the top features of the labelled data, with the proxy regression model, to determine feature data identifying an importance of each of the subsets of the top features. In some implementations, the validation system 110 may determine the subsets of the top features based on the data labels associated with the top features. For example, the validation system 110 may determine a first subset of the top features associated with a first data label, may determine a second subset of the top features associated with a second data label different from the first data label, and/or the like.

In some implementations, the validation system 110 may process the subsets of the top features of the labelled data, with the proxy regression model, to identify the importance of each of the subsets of the top features based on model feature coefficients. Each of the model feature coefficients represents a relationship between a given feature and a target feature, assuming that all the other features remain constant (e.g., conditional dependence). The validation system 110 may combine the importance of each of the subsets of the top features to generate the feature data.

Figure 1E:
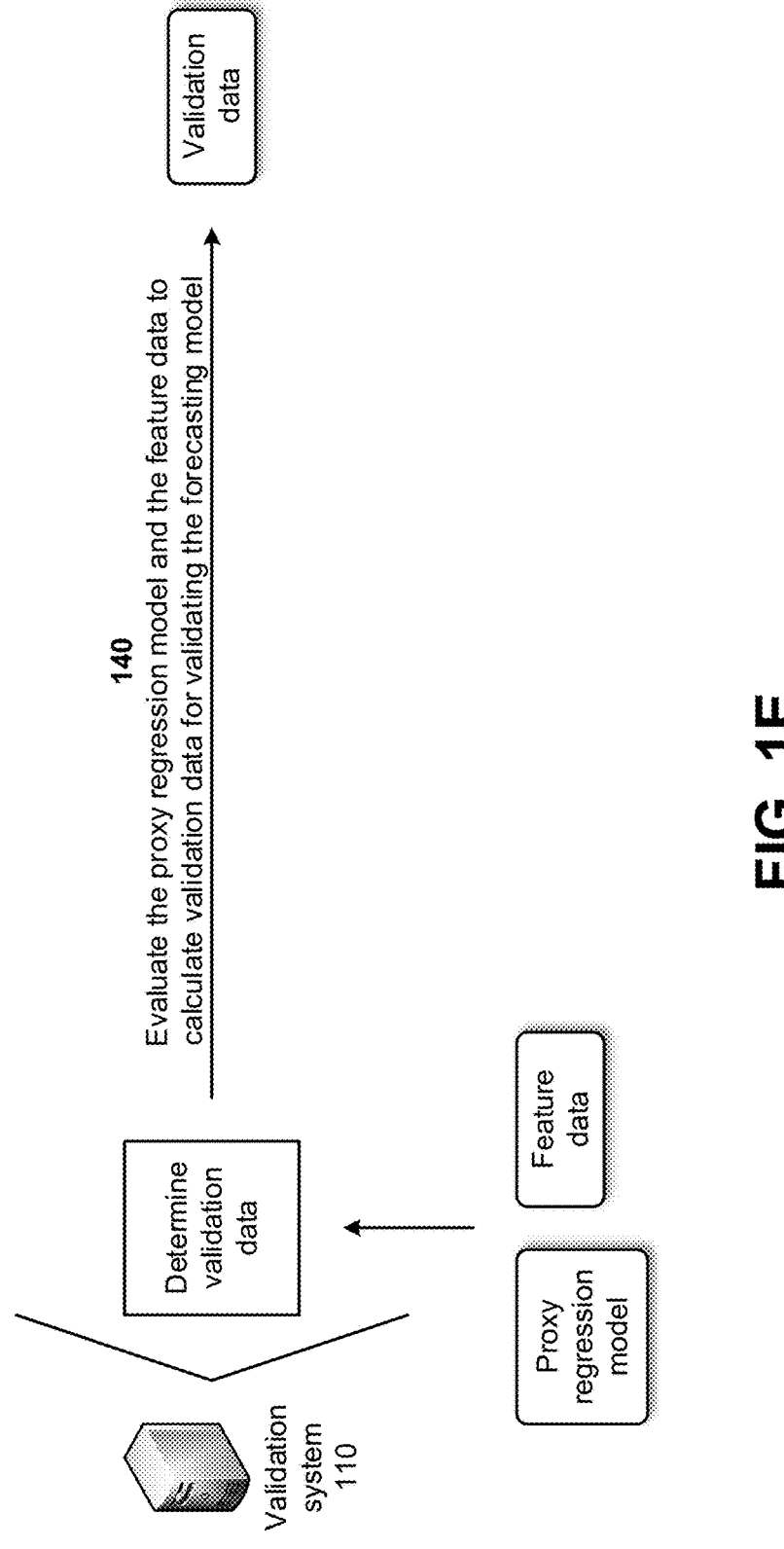

As shown in FIG. 1E, and by reference number 140, the validation system 110 may evaluate the proxy regression model and the feature data to calculate validation data for validating the forecasting model. In some implementations, when evaluating the proxy regression model and the feature data to calculate the validation data, the validation system 110 may evaluate the proxy regression model and the feature data to calculate a dimension for the validation data (e.g., n-dimensional data that may be utilized for validating the forecasting model).

In some implementations, when evaluating the proxy regression model and the feature data to calculate the validation data, the validation system 110 may determine a mean absolute error (e.g., a measure of errors between paired observations expressing a same phenomenon), a root mean square error, an $R^2$ error, and/or the like, associated with the proxy regression model based on the feature data, and determine a normalized mean absolute error percentage (e.g., a metric is used to facilitate comparison regarding mean absolute errors of datasets with different scales) associated with the proxy regression model based on the feature data. The validation system 110 may also determine a mean absolute percentage error (e.g., a measure of a prediction accuracy of the forecasting model) associated with the proxy regression model based on the feature data, and may calculate the validation data based on the mean absolute error, the normalized mean absolute error percentage, and the mean absolute percentage error.

Figure 1F:
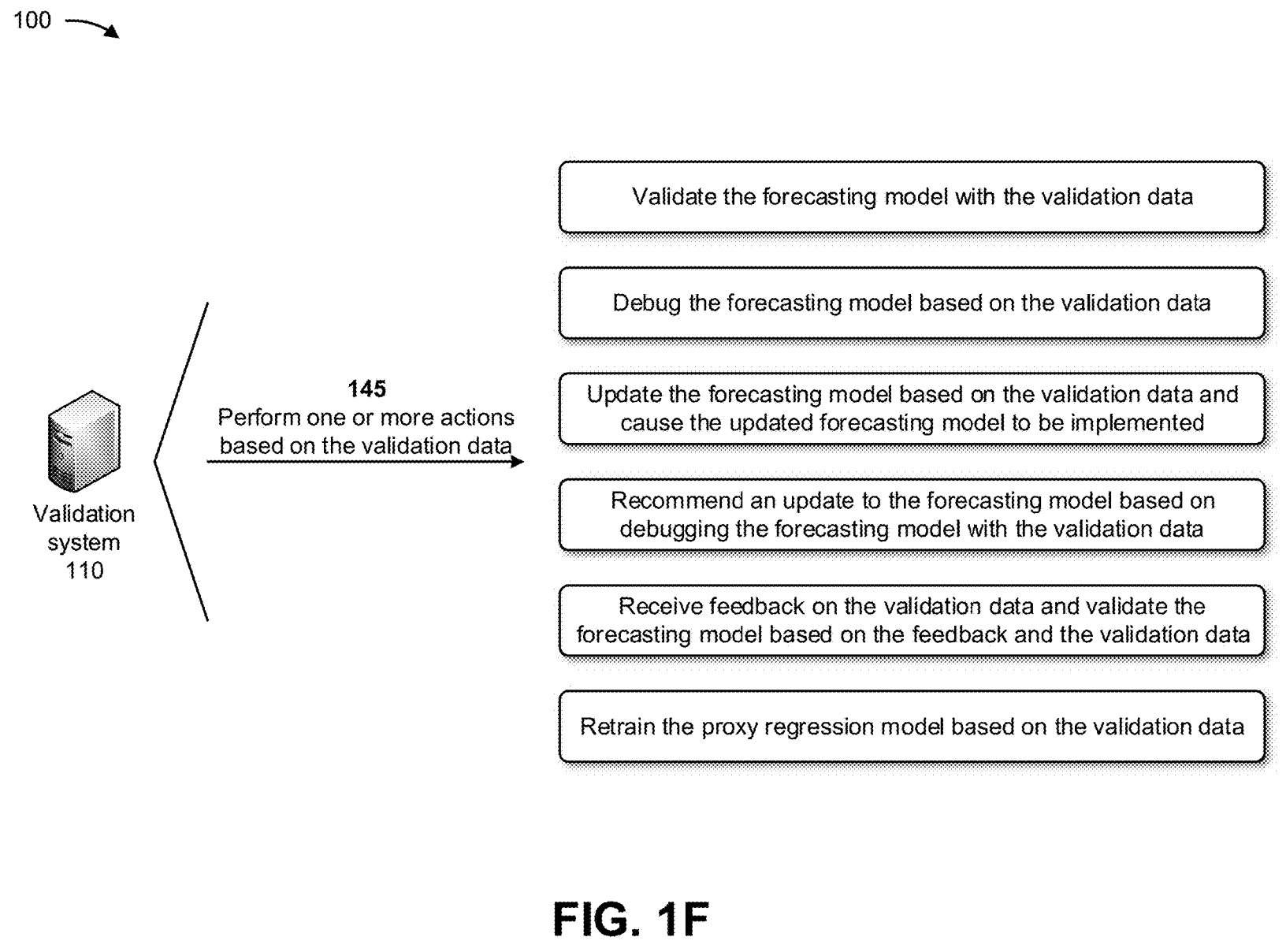

As shown in FIG. 1F, and by reference number 145, the validation system 110 may perform one or more actions based on the validation data. In some implementations, the one or more actions include the validation system 110 validating the forecasting model with the validation data. For example, the validation system 110 may process a portion of the validation data, with the forecasting model, to generate output data, and may compare the output data with another portion of the validation data. The validation system 110 may determine whether the output data matches the other portion of the validation data. If the output data matches the other portion of the validation data, the validation system 110 may validate the forecasting model. If the output data fails to match the other portion of the validation data, the validation system 110 may not validate the forecasting model. In this way, the validation system 110 conserves computing resources, networking resources, and other resources that would otherwise be consumed in validating an incorrect forecasting model, deploying the incorrect forecasting model, handling customer complaints associated with the incorrect forecasting model, and/or the like.

In some implementations, the one or more actions include the validation system 110 debugging the forecasting model based on the validation data. Returning to the previous example, if the output data fails to match the other portion of the validation data, the validation system 110 may not validate the forecasting model and may debug the forecasting model based on the output data that fails to match the other portion of the validation data. For example, the validation system 110 may provide, for display, an indication of the output data that fails to match the other portion of the validation data, so that a software developer may debug or determine why the output data fails to match the other portion of the validation data. Alternatively, the validation system 110 may debug or determine why the output data fails to match the other portion of the validation data. In this way, the validation system 110 conserves computing resources, networking resources, and other resources that would otherwise be consumed in deploying an incorrect forecasting model, handling customer complaints associated with the incorrect forecasting model, utilizing resources inefficiently and ineffectively based on an output of the incorrect forecasting model, and/or the like.

In some implementations, the one or more actions include the validation system 110 updating the forecasting model based on the validation data and causing the updated forecasting model to be implemented. Returning to the previous example, the validation system 110 may debug or determine why the output data fails to match the other portion of the validation data and may update the forecasting model based on results of determining why the output data fails to match the other portion of the validation data. The validation system 110 may then cause the updated forecasting model to be deployed. In this way, the validation system 110 conserves computing resources, networking resources, and other resources that would otherwise be consumed in validating an incorrect forecasting model, deploying the incorrect forecasting model, utilizing resources inefficiently and ineffectively based on an output of the incorrect forecasting model, and/or the like.

In some implementations, the one or more actions include the validation system 110 recommending an update to the forecasting model based on debugging the forecasting model with the validation data. For example, the validation system 110 may debug the forecasting model, as described above, and may generate a recommended update to the forecasting model based on results of determining why the output data fails to match the other portion of the validation data. The validation system 110 may provide the recommended update for display to a software developer so that the software developer may update the forecasting model based on the recommended update. In this way, the validation system 110 conserves computing resources, networking resources, and other resources that would otherwise be consumed in validating an incorrect forecasting model, deploying the incorrect forecasting model, handling customer complaints associated with the incorrect forecasting model, and/or the like.

In some implementations, the one or more actions include the validation system 110 receiving feedback on the validation data and validating the forecasting model based on the feedback and the validation data. For example, the validation system 110 may provide the validation data for display to a software developer and may receive feedback on the validation data from the software developer. The validation system 110 may validate the forecasting model based on the feedback and the validation data in a manner described above for validating the forecasting model based on the validation data. In this way, the validation system 110 conserves computing resources, networking resources, and other resources that would otherwise be consumed in validating an incorrect forecasting model, deploying the incorrect forecasting model, handling customer complaints associated with the incorrect forecasting model, and/or the like.

In some implementations, the one or more actions include the validation system 110 retraining the proxy regression model based on the validation data. The validation system 110 may utilize the validation data as additional training data for retraining the proxy regression model, thereby increasing the quantity of training data available for training the proxy regression model. Accordingly, the validation system 110 may conserve computing resources associated with identifying, obtaining, and/or generating historical data for training the proxy regression model relative to other systems for identifying, obtaining, and/or generating historical data for training machine learning models.

As described above, the validation system 110 validates forecasting machine learning models. The validation system 110 may identify the most important and significant features for an output of a forecasting machine learning model and may validate the forecasting machine learning model based on the features prior to deploying the forecasting machine learning model. The validation system 110 may utilize the features to debug and improve a quality of the forecasting machine learning model. Thus, the validation system 110 conserves computing resources, networking resources, and other resources that would otherwise be consumed in validating an incorrect forecasting machine learning model, deploying the incorrect forecasting machine learning model, handling customer complaints associated with the incorrect forecasting machine learning model, utilizing resources inefficiently and ineffectively based on an output of the incorrect forecasting machine learning model, and/or the like.

As indicated above, FIGS. 1A-1F are provided as an example. Other examples may differ from what is described with regard to FIGS. 1A-1F. The number and arrangement of devices shown in FIGS. 1A-1F are provided as an example. In practice, there may be additional devices, fewer devices, different devices, or differently arranged devices than those shown in FIGS. 1A-1F. Furthermore, two or more devices shown in FIGS. 1A-1F may be implemented within a single device, or a single device shown in FIGS. 1A-1F may be implemented as multiple, distributed devices. Additionally, or alternatively, a set of devices (e.g., one or more devices) shown in FIGS. 1A-1F may perform one or more functions described as being performed by another set of devices shown in FIGS. 1A-1F.

Figure 2:
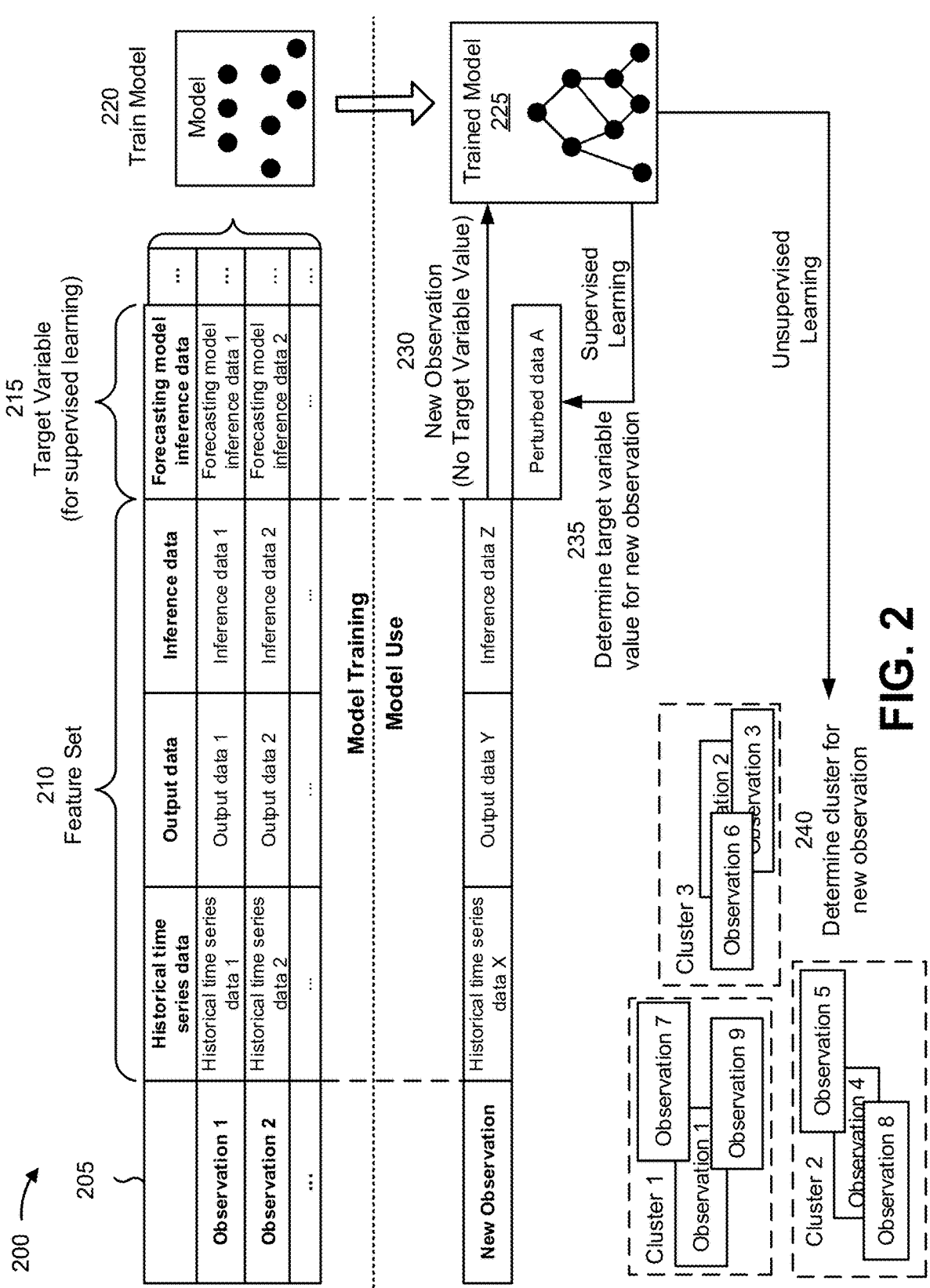
FIG. 2 is a diagram illustrating an example of training and using a machine learning model in connection with validating forecasting machine learning models.

FIG. 2 is a diagram illustrating an example 200 of training and using a machine learning model in connection with validating forecasting machine learning models. The machine learning model training and usage described herein may be performed using a machine learning system. The machine learning system may include or may be included in a computing device, a server, a cloud computing environment, or the like, such as the validation system 110 described in more detail elsewhere herein.

As shown by reference number 205, a machine learning model may be trained using a set of observations. The set of observations may be obtained from training data (e.g., historical data), such as data gathered during one or more processes described herein. In some implementations, the machine learning system may receive the set of observations (e.g., as input) from the server device 105 and/or the validation system 110, as described elsewhere herein.

As shown by reference number 210, the set of observations includes a feature set. The feature set may include a set of variables, and a variable may be referred to as a feature. A specific observation may include a set of variable values (or feature values) corresponding to the set of variables. In some implementations, the machine learning system may determine variables for a set of observations and/or variable values for a specific observation based on input received from the server device 105 and/or the validation system 110. For example, the machine learning system may identify a feature set (e.g., one or more features and/or feature values) by extracting the feature set from structured data, by performing natural language processing to extract the feature set from unstructured data, and/or by receiving input from an operator.

As an example, a feature set for a set of observations may include a first feature of historical time series data, a second feature of output data, a third feature of inference data, and so on. As shown, for a first observation, the first feature may have a value of historical time series data 1, the second feature may have a value of output data 1, the third feature may have a value of inference data 1, and so on. These features and feature values are provided as examples and may differ in other examples.

As shown by reference number 215, the set of observations may be associated with a target variable. The target variable may represent a variable having a numeric value, may represent a variable having a numeric value that falls within a range of values or has some discrete possible values, may represent a variable that is selectable from one of multiple options (e.g., one of multiples classes, classifications, or labels) and/or may represent a variable having a Boolean value. A target variable may be associated with a target variable value, and a target variable value may be specific to an observation. In example 200, the target variable is the forecasting model inference data, which has a value of forecasting model inference data 1 for the first observation.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model.

In some implementations, the machine learning model may be trained on a set of observations that do not include a target variable. This may be referred to as an unsupervised learning model. In this case, the machine learning model may learn patterns from the set of observations without labeling or supervision, and may provide output that indicates such patterns, such as by using clustering and/or association to identify related groups of items within the set of observations.

As shown by reference number 220, the machine learning system may train a machine learning model using the set of observations and using one or more machine learning algorithms, such as a regression algorithm, a decision tree algorithm, a neural network algorithm, a k-nearest neighbor algorithm, a support vector machine algorithm, or the like. After training, the machine learning system may store the machine learning model as a trained machine learning model 225 to be used to analyze new observations.

As shown by reference number 230, the machine learning system may apply the trained machine learning model 225 to a new observation, such as by receiving a new observation and inputting the new observation to the trained machine learning model 225. As shown, the new observation may include a first feature of historical time series data X, a second feature of output data Y, a third feature of inference data Z, and so on, as an example. The machine learning system may apply the trained machine learning model 225 to the new observation to generate an output (e.g., a result). The type of output may depend on the type of machine learning model and/or the type of machine learning task being performed. For example, the output may include a predicted value of a target variable, such as when supervised learning is employed. Additionally, or alternatively, the output may include information that identifies a cluster to which the new observation belongs and/or information that indicates a degree of similarity between the new observation and one or more other observations, such as when unsupervised learning is employed.

As an example, the trained machine learning model 225 may predict a value of forecasting model inference data A for the target variable of the forecasting model inference data for the new observation, as shown by reference number 235. Based on this prediction, the machine learning system may provide a first recommendation, may provide output for determination of a first recommendation, may perform a first automated action, and/or may cause a first automated action to be performed (e.g., by instructing another device to perform the automated action), among other examples.

As another example, if the machine learning system were to predict a value of forecasting model inference B for the target variable of the forecasting model inference data, then the machine learning system may provide a second (e.g., different) recommendation and/or may perform or cause performance of a second (e.g., different) automated action.

In some implementations, the trained machine learning model 225 may classify (e.g., cluster) the new observation in a cluster, as shown by reference number 240. The observations within a cluster may have a threshold degree of similarity. As an example, if the machine learning system classifies the new observation in a first cluster (e.g., a historical time series data cluster), then the machine learning system may provide a first recommendation, such as the first recommendation described above. Additionally, or alternatively, the machine learning system may perform a first automated action and/or may cause a first automated action to be performed (e.g., by instructing another device to perform the automated action) based on classifying the new observation in the first cluster, such as the first automated action described above.

As another example, if the machine learning system were to classify the new observation in a second cluster (e.g., an output data cluster), then the machine learning system may provide a second (e.g., different) recommendation, such as the second recommendation described above and/or may perform or cause performance of a second automated action, such as the second automated action described above.

In some implementations, the recommendation and/or the automated action associated with the new observation may be based on a target variable value having a particular label (e.g., classification or categorization), may be based on whether a target variable value satisfies one or more threshold (e.g., whether the target variable value is greater than a threshold, is less than a threshold, is equal to a threshold, falls within a range of threshold values, or the like), and/or may be based on a cluster in which the new observation is classified.

In this way, the machine learning system may apply a rigorous and automated process to validate forecasting machine learning models. The machine learning system enables recognition and/or identification of tens, hundreds, thousands, or millions of features and/or feature values for tens, hundreds, thousands, or millions of observations, thereby increasing accuracy and consistency and reducing delay associated with validating forecasting machine learning models relative to requiring computing resources to be allocated for tens, hundreds, or thousands of operators to manually validate forecasting machine learning models.

As indicated above, FIG. 2 is provided as an example. Other examples may differ from what is described in connection with FIG. 2.

Figure 3:
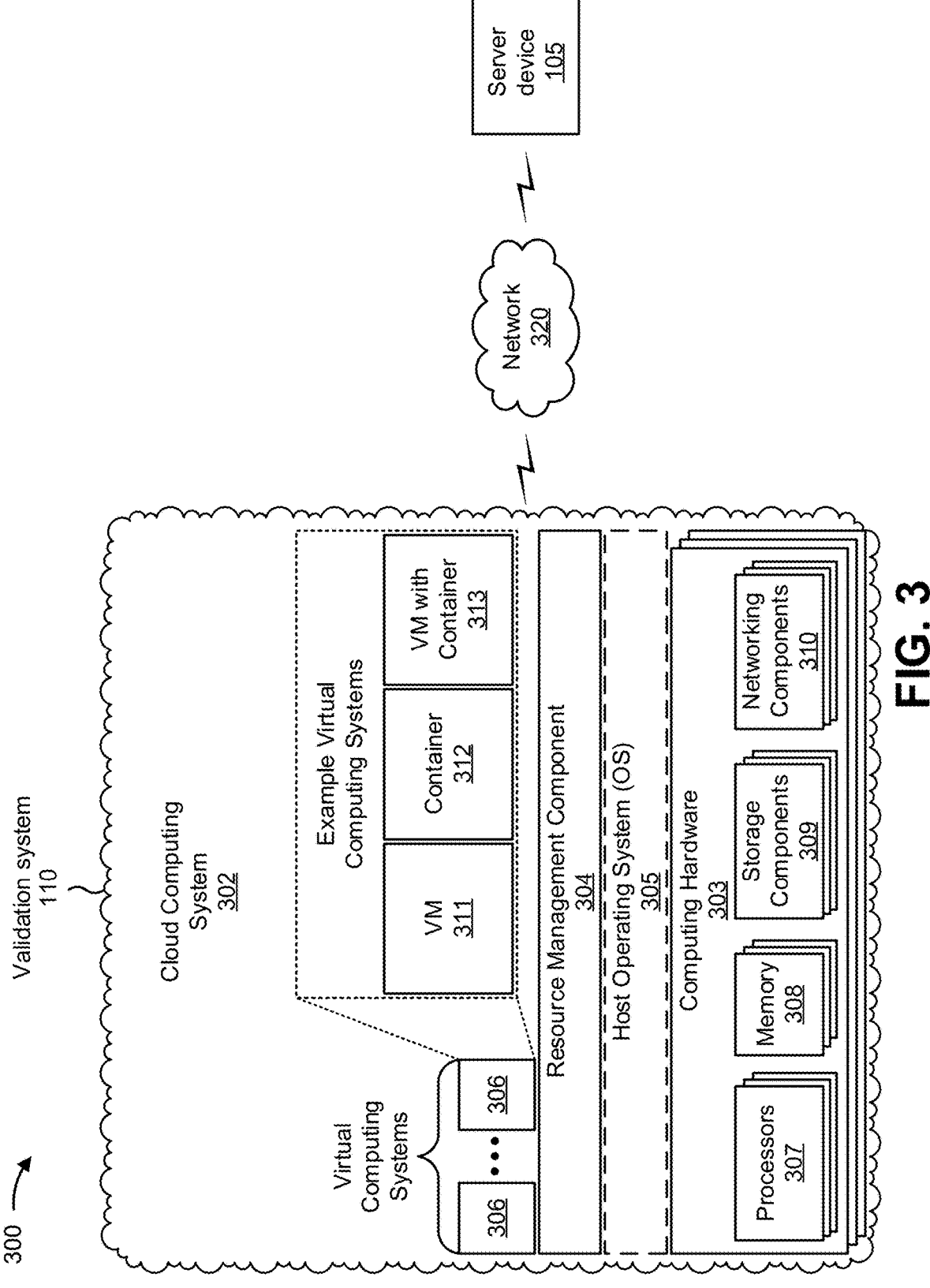
FIG. 3 is a diagram of an example environment in which systems and/or methods described herein may be implemented.

FIG. 3 is a diagram of an example environment 300 in which systems and/or methods described herein may be implemented. As shown in FIG. 3, environment 300 may include a validation system 110, which may include one or more elements of and/or may execute within a cloud computing system 302. The cloud computing system 302 may include one or more elements 303-313, as described in more detail below. As further shown in FIG. 3, environment 300 may include the server device 105 and/or a network 320. Devices and/or elements of environment 300 may interconnect via wired connections and/or wireless connections.

The server device 105 includes one or more devices capable of receiving, generating, storing, processing, providing, and/or routing information, as described elsewhere herein. The server device 105 may include a communication device and/or a computing device. For example, the server device 105 may include a server, such as an application server, a client server, a web server, a database server, a host server, a proxy server, a virtual server (e.g., executing on computing hardware), or a server in a cloud computing system. In some implementations, the server device 105 includes computing hardware used in a cloud computing environment.

The cloud computing system 302 includes computing hardware 303, a resource management component 304, a host operating system (OS) 305, and/or one or more virtual computing systems 306. The resource management component 304 may perform virtualization (e.g., abstraction) of computing hardware 303 to create the one or more virtual computing systems 306. Using virtualization, the resource management component 304 enables a single computing device (e.g., a computer or a server) to operate like multiple computing devices, such as by creating multiple isolated virtual computing systems 306 from computing hardware 303 of the single computing device. In this way, computing hardware 303 can operate more efficiently, with lower power consumption, higher reliability, higher availability, higher utilization, greater flexibility, and lower cost than using separate computing devices.

The computing hardware 303 includes hardware and corresponding resources from one or more computing devices. For example, the computing hardware 303 may include hardware from a single computing device (e.g., a single server) or from multiple computing devices (e.g., multiple servers), such as multiple computing devices in one or more data centers. As shown, the computing hardware 303 may include one or more processors 307, one or more memories 308, one or more storage components 309, and/or one or more networking components 310. Examples of a processor, a memory, a storage component, and a networking component (e.g., a communication component) are described elsewhere herein.

The resource management component 304 includes a virtualization application (e.g., executing on hardware, such as computing hardware 303) capable of virtualizing computing hardware 303 to start, stop, and/or manage one or more virtual computing systems 306. For example, the resource management component 304 may include a hypervisor (e.g., a bare-metal or Type 1 hypervisor, a hosted or Type 2 hypervisor, or another type of hypervisor) or a virtual machine monitor, such as when the virtual computing systems 306 are virtual machines 311. Additionally, or alternatively, the resource management component 304 may include a container manager, such as when the virtual computing systems 306 are containers 312. In some implementations, the resource management component 304 executes within and/or in coordination with a host operating system 305.

A virtual computing system 306 includes a virtual environment that enables cloud-based execution of operations and/or processes described herein using computing hardware 303. As shown, the virtual computing system 306 may include a virtual machine 311, a container 312, or a hybrid environment 313 that includes a virtual machine and a container, among other examples. The virtual computing system 306 may execute one or more applications using a file system that includes binary files, software libraries, and/or other resources required to execute applications on a guest operating system (e.g., within the virtual computing system 306) or the host operating system 305.

Although the validation system 110 may include one or more elements 303-313 of the cloud computing system 302, may execute within the cloud computing system 302, and/or may be hosted within the cloud computing system 302, in some implementations, the validation system 110 may not be cloud-based (e.g., may be implemented outside of a cloud computing system) or may be partially cloud-based. For example, the validation system 110 may include one or more devices that are not part of the cloud computing system 302, such as device 400 of FIG. 4, which may include a standalone server or another type of computing device. The validation system 110 may perform one or more operations and/or processes described in more detail elsewhere herein.

The network 320 includes one or more wired and/or wireless networks. For example, the network 320 may include a cellular network, a public land mobile network (PLMN), a local area network (LAN), a wide area network (WAN), a private network, the Internet, and/or a combination of these or other types of networks. The network 320 enables communication among the devices of environment 300.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

Figure 4:
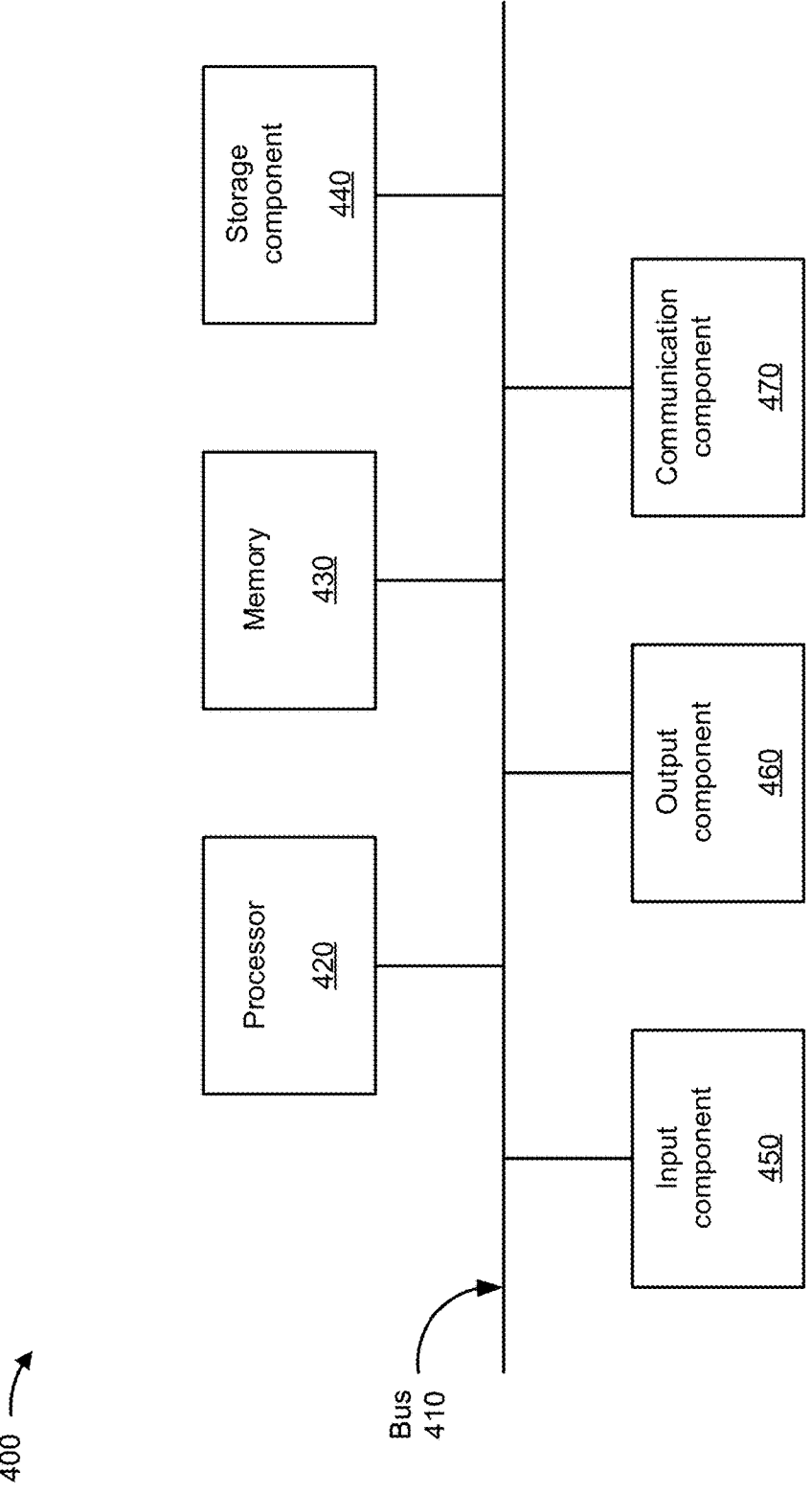
FIG. 4 is a diagram of example components of one or more devices of FIG. 3.

FIG. 4 is a diagram of example components of a device 400, which may correspond to the server device 105 and/or the validation system 110. In some implementations, the server device 105 and/or the validation system 110 may include one or more devices 400 and/or one or more components of device 400. As shown in FIG. 4, device 400 may include a bus 410, a processor 420, a memory 430, a storage component 440, an input component 450, an output component 460, and a communication component 470.

Bus 410 includes a component that enables wired and/or wireless communication among the components of device 400. Processor 420 includes a central processing unit, a graphics processing unit, a microprocessor, a controller, a microcontroller, a digital signal processor, a field-programmable gate array, an application-specific integrated circuit, and/or another type of processing component. Processor 420 is implemented in hardware, firmware, or a combination of hardware and software. In some implementations, processor 420 includes one or more processors capable of being programmed to perform a function. Memory 430 includes a random-access memory, a read only memory, and/or another type of memory (e.g., a flash memory, a magnetic memory, and/or an optical memory).

Storage component 440 stores information and/or software related to the operation of device 400. For example, storage component 440 may include a hard disk drive, a magnetic disk drive, an optical disk drive, a solid-state disk drive, a compact disc, a digital versatile disc, and/or another type of non-transitory computer-readable medium. Input component 450 enables the device 400 to receive input, such as user input and/or sensed inputs. For example, input component 450 may include a touch screen, a keyboard, a keypad, a mouse, a button, a microphone, a switch, a sensor, a global positioning system component, an accelerometer, a gyroscope, and/or an actuator. Output component 460 enables the device 400 to provide output, such as via a display, a speaker, and/or one or more light-emitting diodes. The communication component 470 enables the device 400 to communicate with other devices, such as via a wired connection and/or a wireless connection. For example, the communication component 470 may include a receiver, a transmitter, a transceiver, a modem, a network interface card, and/or an antenna.

The device 400 may perform one or more processes described herein. For example, a non-transitory computer-readable medium (e.g., memory 430 and/or storage component 440) may store a set of instructions (e.g., one or more instructions, code, software code, and/or program code) for execution by processor 420. Processor 420 may execute the set of instructions to perform one or more processes described herein. In some implementations, execution of the set of instructions, by one or more processors 420, causes the one or more processors 420 and/or the device 400 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 4 are provided as an example. The device 400 may include additional components, fewer components, different components, or differently arranged components than those shown in FIG. 4. Additionally, or alternatively, a set of components (e.g., one or more components) of the device 400 may perform one or more functions described as being performed by another set of components of the device 400.

FIG. 5 is a flowchart of an example process 500 associated with validating forecasting machine learning models. In some implementations, one or more process blocks of FIG. 5 may be performed by a device (e.g., the validation system 110). In some implementations, one or more process blocks of FIG. 5 may be performed by another device or a group of devices separate from or including the device, such as a server device (e.g., the server device 105). Additionally, or alternatively, one or more process blocks of FIG. 5 may be performed by one or more components of device 400, such as the processor 420, the memory 430, the storage component 440, the input component 450, the output component 460, and/or the communication component 470.

As shown in FIG. 5, process 500 may include receiving historical time series data and output data associated with a forecasting model (block 510). For example, the device may receive historical time series data and output data associated with a forecasting model, as described above. In some implementations, the historical time series data include univariate time series data. In some implementations, the forecasting model is to generate one or more of a network load prediction for operation of a network, or a call center staffing prediction for a customer service center.

As further shown in FIG. 5, process 500 may include processing the historical time series data and the output data, with a proxy regression model, to determine inference data identifying an importance of each time step of the historical time series data (block 520). For example, the device may process the historical time series data and the output data, with a proxy regression model, to determine inference data identifying an importance of each time step of the historical time series data, as described above. In some implementations, the proxy regression model includes one or more of a linear regression model, a random forest model, a logistic regression model, a ridge regression model, a lasso regression model, or a polynomial regression model. In some implementations, the historical time series data is a predictor for the proxy regression model and the output data is a label for the proxy regression model.

As further shown in FIG. 5, process 500 may include creating perturbed data from the historical time series data, the output data, and the inference data (block 530). For example, the device may create perturbed data from the historical time series data, the output data, and the inference data, as described above.

As further shown in FIG. 5, process 500 may include processing the perturbed data, with the proxy regression model, to generate labelled data and to identify top features of the labelled data relative to other features of the labelled data (block 540). For example, the device may process the perturbed data, with the proxy regression model, to generate labelled data and to identify top features of the labelled data relative to other features of the labelled data, as described above.

As further shown in FIG. 5, process 500 may include processing, by the device, subsets of the top features of the labelled data, with the proxy regression model, to determine feature data identifying an importance of each of the subsets of the top features (block 550). For example, the device may process subsets of the top features of the labelled data, with the proxy regression model, to determine feature data identifying an importance of each of the subsets of the top features, as described above.

As further shown in FIG. 5, process 500 may include evaluating the proxy regression model and the feature data to calculate validation data for validating the forecasting model (block 560). For example, the device may evaluate the proxy regression model and the feature data to calculate validation data for validating the forecasting model, as described above. In some implementations, evaluating the proxy regression model and the feature data to calculate the validation data includes determining a mean absolute error associated with the proxy regression model based on the feature data, determining a normalized mean absolute error percentage associated with the proxy regression model based on the feature data, determining a mean absolute percentage error associated with the proxy regression model based on the feature data, and calculating the validation data based on the mean absolute error, the normalized mean absolute error percentage, and the mean absolute percentage error.

In some implementations, evaluating the proxy regression model and the feature data to calculate the validation data includes evaluating the proxy regression model and the feature data to calculate a dimension for the validation data.

As further shown in FIG. 5, process 500 may include validating the forecasting model with the validation data (block 570). For example, the device may validate the forecasting model with the validation data, as described above.

Process 500 may include additional implementations, such as any single implementation or any combination of implementations described below and/or in connection with one or more other processes described elsewhere herein.

In some implementations, process 500 includes debugging the forecasting model based on the validation data and to generate a debugged forecasting model, and causing the debugged forecasting model to be implemented. In some implementations, process 500 includes updating the forecasting model based on the validation data and to generate an updated forecasting model, and causing the updated forecasting model to be implemented.

In some implementations, process 500 includes generating a recommended update to the forecasting model based on debugging the forecasting model with the validation data and providing the recommended update for display. In some implementations, process 500 includes receiving feedback on the validation data, and revalidating the forecasting model based on the feedback and the validation data. In some implementations, process 500 includes retraining the proxy regression model based on the validation data. In some implementations, process 500 includes causing the forecasting model to be implemented after the forecasting model is validated with the validation data.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:

receiving, by a device, historical time series data and output data associated with a forecasting model;

training, by the device, a proxy regression model with the historical time series data and the output data, wherein the trained proxy regression model outputs inference data identifying an importance of each time step of the historical time series data;

analyzing, by the device, the historical time series data, the output data, and the inference data to identify confidential information in the historical time series data, the output data, and the inference data;

creating, by the device, perturbed data from the historical time series data, the output data, and the inference data, wherein the perturbed data comprises noisy or synthetic data that protects the confidential information in the historical time series data, the output data, and the inference data;

processing, by the device, the perturbed data, with the trained proxy regression model, to generate labelled data and to identify top features of the labelled data relative to other features of the labelled data;

processing, by the device, subsets of the top features of the labelled data, with the trained proxy regression model, to determine feature data identifying an importance of each of the subsets of the top features of the labelled data;

determining, by the device and based on the feature data, a plurality of types of error values associated with the trained proxy regression model;

calculating validation data for validating the forecasting model based on the plurality of types of error values associated with the trained proxy regression model;

validating, by the device, the forecasting model with the validation data; and retraining, by the device, the trained proxy regression model with the validation data.

2. The method of claim 1, wherein the historical time series data includes univariate time series data.

3. The method of claim 1, wherein the trained proxy regression model includes one or more of:

a linear regression model, a random forest model, a logistic regression model, a ridge regression model, a lasso regression model, or a polynomial regression model.

4. The method of claim 1, wherein the plurality of types of error values associated with the trained proxy regression model comprise:

a mean absolute error value associated with the trained proxy regression model and based on the feature data;

a normalized mean absolute error percentage value associated with the trained proxy regression model and based on the feature data; and a mean absolute percentage error value associated with the trained proxy regression model and based on the feature data.

5. The method of claim 1, wherein the forecasting model is to generate one or more of:

a network load prediction for operation of a network, or a call center staffing prediction for a customer service center.

6. The method of claim 1, further comprising:

debugging the forecasting model based on the validation data and to generate a debugged forecasting model; and causing the debugged forecasting model to be implemented.

7. A device, comprising:

one or more processors configured to:

receive historical time series data and output data associated with a forecasting model, wherein the historical time series data includes univariate time series data;

train a proxy regression model with the historical time series data and the output data, wherein the trained proxy regression model outputs inference data identifying an importance of each time step of the historical time series data;

analyze the historical time series data, the output data, and the inference data to identify confidential information in the historical time series data, the output data, and the inference data;

create perturbed data from the historical time series data, the output data, and the inference data, wherein the perturbed data comprises noisy or synthetic data that protects the confidential information in the historical time series data, the output data, and the inference data;

process the perturbed data, with the trained proxy regression model, to generate labelled data and to identify top features of the labelled data relative to other features of the labelled data;

process subsets of the top features of the labelled data, with the trained proxy regression model, to determine feature data identifying an importance of each of the subsets of the top features of the labelled data;

determine, based on the feature data, a plurality of types of error values associated with the trained proxy regression model;

calculate validation data for validating the forecasting model based on the plurality of types of error values associated with the trained proxy regression model;

validate the forecasting model with the validation data; and retrain the trained proxy regression model with the validation data.

8. The device of claim 7, wherein the one or more processors are further configured to:

generate a recommended update to the forecasting model based on debugging the forecasting model with the validation data; and provide the recommended update for display.

9. The device of claim 7, wherein the one or more processors are further configured to:

receive feedback on the validation data; and revalidate the forecasting model based on the feedback and the validation data.

10. The device of claim 7, wherein the one or more processors, to evaluate the trained proxy regression model and the feature data to calculate the validation data, are configured to:

evaluate the trained proxy regression model and the feature data to calculate a dimension for the validation data.

11. The device of claim 7, wherein the historical time series data is a predictor for the trained proxy regression model and the output data is a label for the trained proxy regression model.

12. A non-transitory computer-readable medium storing a set of instructions, the set of instructions comprising:

one or more instructions that, when executed by one or more processors of a device, cause the device to:

receive historical time series data and output data associated with a forecasting model;

train a proxy regression model with the historical time series data and the output data, wherein the trained proxy regression model outputs inference data identifying an importance of each time step of the historical time series data;

analyze the historical time series data, the output data, and the inference data to identify confidential information in the historical time series data, the output data, and the inference data;

create perturbed data from the historical time series data, the output data, and the inference data, wherein the perturbed data comprises noisy or synthetic data that protects the confidential information in the historical time series data, the output data, and the inference data;

process the perturbed data, with the trained proxy regression model, to generate labelled data and to identify top features of the labelled data relative to other features of the labelled data;

process, by the device, subsets of the top features of the labelled data, with the trained proxy regression model, to determine feature data identifying an importance of each of the subsets of the top features of the labelled data;

determine, by the device and based on the feature data, a plurality of types of error values associated with the trained proxy regression model;

calculate validation data for validating the forecasting model based on the plurality of types of error values associated with the trained proxy regression model;

validate the forecasting model with the validation data; and retrain the trained proxy regression model with the validation data.

13. The non-transitory computer-readable medium of claim 12, wherein the plurality of types of error values comprise:

a mean absolute error value associated with the trained proxy regression model and based on the feature data;

a normalized mean absolute error percentage value associated with the trained proxy regression model and based on the feature data; and a mean absolute percentage error value associated with the trained proxy regression model and based on the feature data.

14. The non-transitory computer-readable medium of claim 12, wherein the one or more instructions further cause the device to generate one or more of:

a network load prediction for operation of a network, or a call center staffing prediction for a customer service center.

15. The non-transitory computer-readable medium of claim 12, wherein the one or more instructions further cause the device to:

generate a recommended update to the forecasting model based on validating the forecasting model with the validation data; and provide the recommended update for display.

16. The non-transitory computer-readable medium of claim 12, wherein the one or more instructions further cause the device to:

receive feedback on the validation data; and revalidate the forecasting model based on the feedback and the validation data.

17. The method of claim 1, wherein receiving the historical time series data and the output data comprises:

receiving, from a network provider, the historical time series data and the output data.

18. The method of claim 1, further comprising: receiving, by the device, feedback on the validation data; and revalidating, by the device, the forecasting model based on the feedback and the validation data, wherein the forecasting model is a machine learning model.

* * * * *